Sept. 15, 1970 J. MORKOSKI 3,528,507
FIELD TILLAGE APPARATUS
Filed March 4, 1968 2 Sheets-Sheet 2

Inventor:
James Morkoski
By J. K. McNeur
Atty.

United States Patent Office 3,528,507
Patented Sept. 15, 1970

3,528,507
FIELD TILLAGE APPARATUS
James Morkoski, Clarendon Hills, Ill., assignor to International Harvester Company, Chicago, Ill., a corporation of Delaware
Filed Mar. 4, 1968, Ser. No. 710,262
Int. Cl. A01b *63/22*
U.S. Cl. 172—413    1 Claim

ABSTRACT OF THE DISCLOSURE

A closely coupled harrow planter combination wherein the harrow is nested below the planter hitch in advance of the planter supporting frame, and is vertically swingable between the planter hitch and the ground. The harrow is self-contained and separable from the planter and is lifted by rocking a shaft mounted on the harrow frame and having an articulated connection to the planter frame, the rocking of the harrow shaft reacting against the planter frame to allow the harrow to lift itself.

SUMMARY OF THE INVENTION

This invention relates to agricultural implements and particularly to a combination of implements performing separate earth treating operations simultaneously. More specifically, the invention concerns a closely coupled implement of the minimum tillage type including a harrow and a planter for depositing seed, fertilizer and the like as the soil is tilled by the harrow.

Customarily, planting and fertilizing and the preparation of the soil therefor are separate operations performed at different times, the farmer having an all-purpose tractor, mounting tools on it for tilling the soil and subsequently removing the tillage tools and substituting the planter. Efforts to combine these operations have been usually along the line of attaching the tillage device, such as a spring tooth harrow to the tractor in trailing relation and attaching the planter to the rear of the harrow to trail therebehind. This practice has resulted in the rearmost unit trailing rather far behind the tractor, rendering control difficult. The present invention contemplates the provision of closely coupled implement units wherein the hitches of the harrow and of the planter are both pivotally connected to the tractor, the harrow unit being nested below the planter hitch and forwardly of the planter tool-carrying frame, facilitating operator control of the entire implement. The harrow and the planter are separable units having their own controls for raising and lowering and can be utilized independently, wheels being provided for the harrow which may be removed or attached as desired. When the harrow and planter are coupled the harrow is raised through a connection to the planter frame allowing the harrow to be lifted with its own power operated means by reaction against the planter frame, the same power operated means being utilized to vertically move a pair of supporting wheels when the harrow is disconnected from the planter and employed as a separate implement. The lifting connection between the harrow and the planter frame also serves to prevent lateral movement of one implement unit relative to the other.

DESCRIPTION OF THE PREFERRED EMBODIMENT

Figure 1:
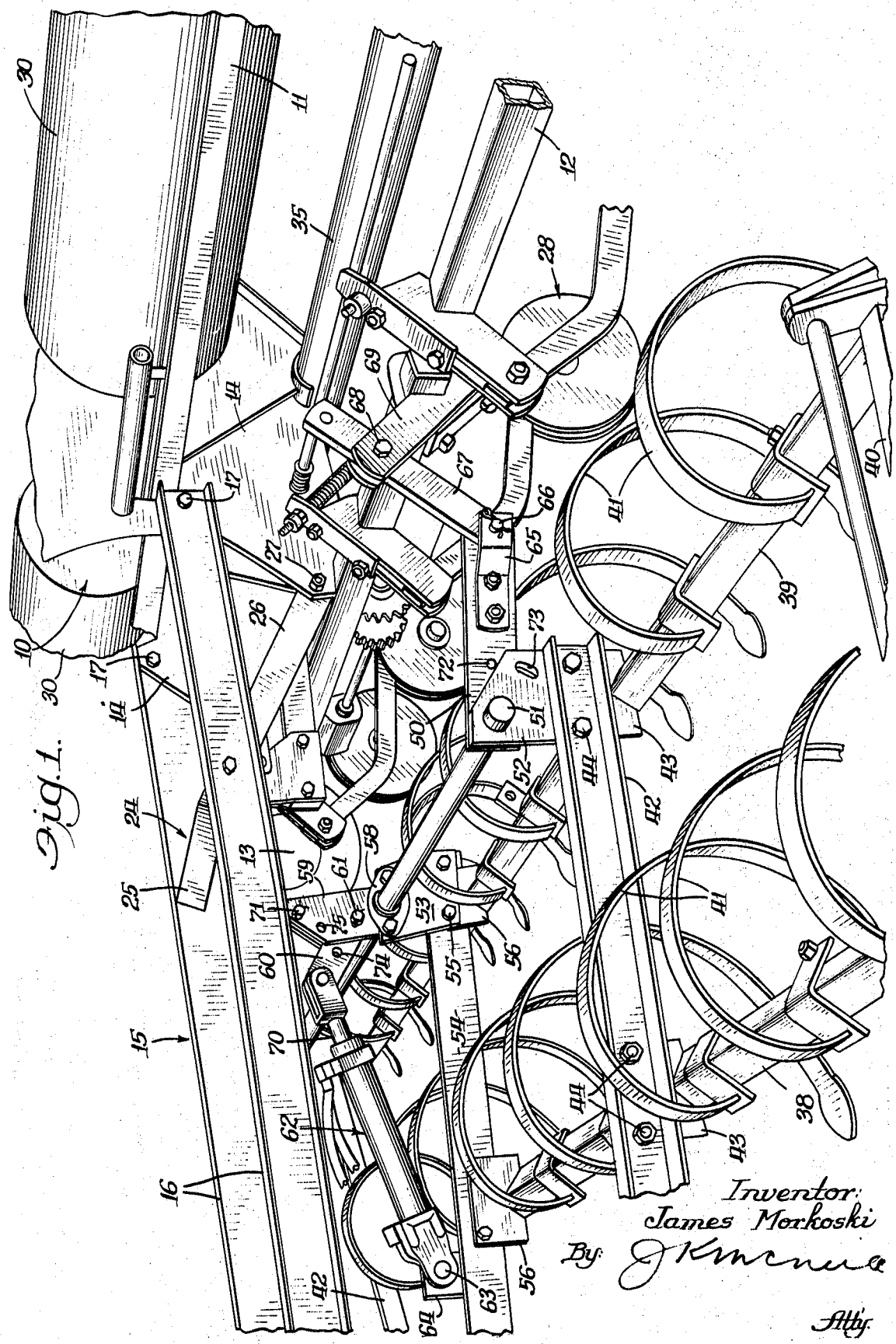
FIG. 1 is a perspective view of a portion of the implement of this invention.

In the drawings the numeral 10 designates the transversely extending frame of a planter of the trail-behind type including structural members 11 and 12 mounted upon spaced wheels 13 and having affixed thereto a pair of centrally disposed generally triangularly shaped plates 14, similar plates, not shown, being provided at the ends of the frame. A forwardly extending hitch frame 15 comprises laterally spaced forwardly converging channel member 16, the rear ends of which are connected by bolts 17 to frame plates 14. The forwardly converging ends of hitch frame members 16 are affixed, as by welding, to the upper end of a plate 18 having a plurality of vertically spaced apertures 19 therein for selective pivotal connection to a clevis 20 by a pin 21 to accommodate vertical floating movement of the planter unit about the axis of pin 21. Clevis 20 is pivotally connected by a pin 22 to the drawbar 23 of a tractor to accommodate lateral swinging of plate 18 and the planter frame about a vertical axis. Hitch frame 15 is made rigid with the plates 14 by the provision of a U-shaped brace 24 having a transverse portion 25 and rearwardly and downwardly extending legs 26 connected to a lower forward portion of plates 14 by bolts 27.

Although many of the constructional details of the planter unit form no part of this invention, it may be understood that a plurality of earthworking discs or furrow opener units 28 are provided for forming furrows into which liquid or other fertilizer 29 contained in tanks 30 is deposited, mounted on frame 10, seed dispensers 31 also being carried by the frame. The discs 28 and planters 31 are vertically moved from an operating position to the transport position shown in solid lines in FIG. 2 by the provision of a hydraulic cylinder 32 operatively connected to an arm 33 of a bellcrack 34 affixed to a transverse shaft 35 rockably mounted in plates 14 and having another arm 36 connected, in a manner not shown, to the earthworking units of the planter.

To prepare the soil in advance of the planter, a spring tooth harrow 37 is provided comprising longitudinally spaced transversely extending tool bars 38 and 39 connected by end bars 40, a plurality of harrow spring teeth 41 being mounted on each of the bars 38 and 39.

Also forming a part of the harrow frame is a hitch structure comprising laterally spaced forwardly converging channel shaped members 42 to which depending lugs 43 are secured by bolts 44, the lower edges of the lugs being provided with V-shaped notches to receive tool bars 38 and 39, to which they are affixed, as by welding.

The entire spring tooth harrow frame is nested between the tractor and the planter frame and the harrow hitch structure is disposed well below the hitch structure 15 of the planter, the forward end of the harrow hitch structure being pivotally connected to the lower portion of plate 18 by a transverse pivot pin 45, accommodating vertical movement of the harrow relative to the planter about the pivot axis of pin 45.

During operation of the implement of this invention, the operating depth of the harrow teeth 41 is gauged by the provision of a pair of laterally spaced gauge wheels 46, only one of which is shown, and each of which is mounted on an arm 47 adjustably secured to a forwardly projecting lug 48 affixed to forward tool bar 38 near each end thereof. It may be understood that the harrow and the planter are self-contained, complete units which may, if desired, be utilized separately. When the harrow is removed from the assembly for use as a separate field implement the position of gauge wheels 46 is altered, the wheels being removed from lugs 48, and each wheel being mounted on an arm 49, shown in dotted lines in FIG. 2 at the rear of the harrow frame. The upper end of arm 49 is then secured to the rear end of a rockarm 50 the forward end of which is affixed to a transverse rockshaft 51 rotatably carried in plates 52 extending upwardly from the rear ends of hitch members 42 and secured thereto by bolts 44. A central supporting plate 53 is secured to the rear end of a central bar 54 by bolts 55, hitch bar 54 also being secured to tool bars 38 and 39 by lugs 56, and the forward end of central bar 54 being secured to hitch members 42 by bolts 57. The upper end of plate 53 carries a bearing 58 rotatably supporting the central portion of shaft 51.

Also mounted on shaft 51 is a pair of upwardly extending lugs 59 between which a link 60 is pivotally mounted by a pin 61. To the upper end of link 61 is connected one end of a hydraulic cylinder 62, the other end of which is anchored at 63 to a lug 64 mounted on bar 54.

Each of the arms 50, secured to opposite ends of rockshaft 51, extends rearwardly therefrom and has secured thereto a clip 65 supporting one end of a pin 66 carried by the rear end of arm 50 to which is pivoted the forwardly and downwardly extending end of a link 67 which is pivotally connencted by a bolt 68 to an arm 69 rigidly secured to planter frame member 12.

Figure 2:
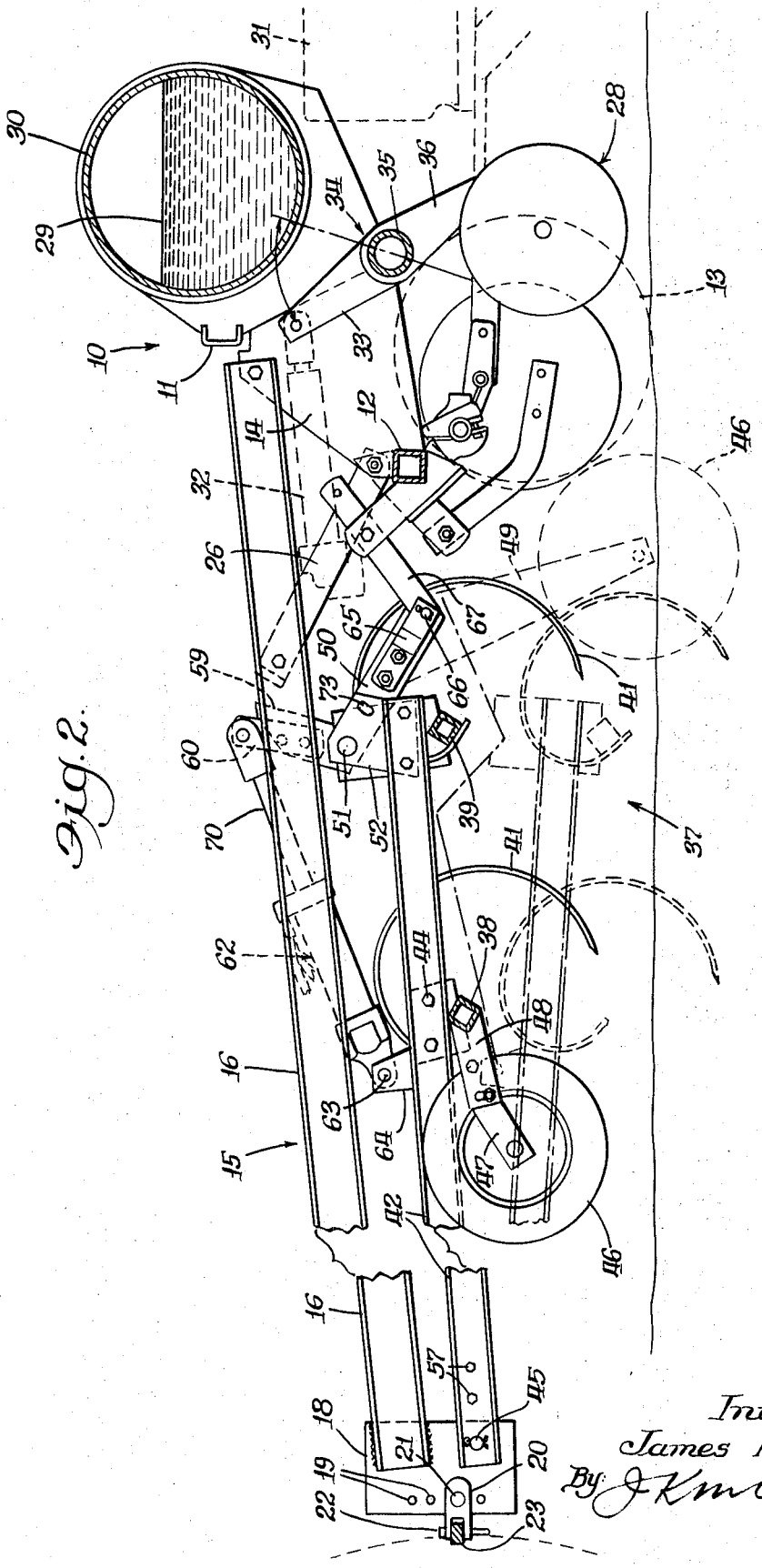
FIG. 2 is a sectional view in side elevation of the implement of this invention in raised position and indicating in dotted lines the working position of the harrow parts.

The harrow 37 is vertically moved from the operating position shown in dotted lines in FIG. 2 to the transport or solid line position thereof by extension of the piston rod 70 of hydraulic cylinder 62, as shown in FIG. 2, to swing link 60 in a clockwise direction until it engages a pin 71 between the upper ends of lugs 59, whereupon shaft 51 is rocked in a clockwise direction, and arms 50 react through the connection of pin 60 and link 67 to arm 69 on the planter to lift the harrow.

When it is desired to remove the harrow from the assembly and utilize it as a separate implement, with wheels 46 shifted to the rear as indicated in dotted lines in FIG. 2, arm 50 is adjustably anchored to plate 52 by the provision of an opening 72 in the arm registrable with a slot 73 in plate 52, suitable bolt means, not shown, being provided to secure the parts together.

Removal of hydraulic cylinder 62 is facilitated by the provision of an opening 74 in link 60 registrable with opening 75 in lugs 59 to receive a locking pin, not shown.

It is believed that the construction and operation of the novel planter and tillage implement of this invention will be clearly understood from the foregoing description.

It should likewise be understood that the invention has been described in its preferred embodiment and that modifications may be made therein without departing from the spirit of the invention or the scope of the appended claim.

What is claimed is:

1. In an agricultural implement, first and second tool frames including first and second hitch means respectively extending forwardly for connection in draft receiving relation to a tractor for vertical swinging movement relative thereto, said second tool frame being disposed below said first hitch means for independent vertical movement relative thereto between operating and transport positions, a transverse rockshaft on the second tool frame, a rockarm affixed to the rockshaft, a link pivoted to said rockarm, a hydraulic cylinder anchored at one end to said second tool frame and at its other end to said link for rocking the rockshaft, means being provided for releasably locking said link to said rockarm to facilitate attachment and detachment of the cylinder, arm means affixed to said rockshaft, a pivotal connection between said arm means and said first tool frame, said connection including means accommodating longitudinal movement of the second tool frame relative to the first tool frame and reacting against the latter upon rocking said rockshaft to vertically move said second frame relative to said first tool frame, means being provided for optionally securing a wheel to said arm means for vertically swinging said wheel upon rocking said rockshaft to raise and lower the second tool frame when the latter has been separated from the implement, and means being provided for optionally locking said arm means to said second tool frame to hold the latter in its raised position.

References Cited

UNITED STATES PATENTS

| | | | |
|---|---|---|---|
| 3,021,908 | 2/1962 | Dlugosch | 172—466 |
| 3,033,135 | 5/1962 | Gouin | 111—52 |
| 3,065,803 | 11/1962 | Pierson | 172—413 |

OTHER REFERENCES 950,531   2/1964   Great Britain.

ROBERT E. BAGWILL, Primary Examiner

A. E. KOPECKI, Assistant Examiner

U.S. Cl. X.R.

172—414, 491, 501